United States Patent [19]

Schulte-Elte

[11] 3,887,625

[45] June 3, 1975

[54] CYCLIC UNSATURATED ALCOHOLS

[75] Inventor: Karl-Heinrich Schulte-Elte, Onex, Geneva, Switzerland

[73] Assignee: Firmenich S.A., Geneva, Switzerland

[22] Filed: Jan. 29, 1973

[21] Appl. No.: 327,842

[30] Foreign Application Priority Data

Feb. 3, 1972  Switzerland.......................... 1618/72

[52] U.S. Cl.......... 260/617 R; 252/572; 260/488 F; 260/586 R; 426/221
[51] Int. Cl............................................. C07c 33/02
[58] Field of Search................................ 260/617 R

[56] References Cited
OTHER PUBLICATIONS

Buchi et al., "Helutlica Chim, Acta," 54, p. 1771, (1971).

Primary Examiner—Donald G. Daus
Assistant Examiner—D. B. Springer
Attorney, Agent, or Firm—Pennie & Edmonds

[57] ABSTRACT

Process for preparing unsaturated alicyclic ketones useful for perfumery and flavour industry and use of certain of the said ketones, some of which are new, as perfuming and/or flavouring ingredients in the manufacture of perfume and perfumed products and/or in the preparation of artificial flavours for foodstuffs, beverages, animal feeds, pharmaceutical preparations and tobacco products.

New hydroxy derivatives used as starting materials in the said process.

6 Claims, No Drawings

CYCLIC UNSATURATED ALCOHOLS

SUMMARY OF THE INVENTION

The invention relates to a new process for preparing unsaturated alicyclic ketones of formula

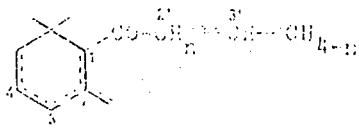

containing a double bond in the 2'- or 3'-position of the side chain, and either a double bond in the 1-, (exo- or endocyclic) 2-, 3-, or 4-position, or two conjugated double bonds in the 1- and 3-, (exocyclic) 2- and 3- or (endocyclic 2- and 4-positions, or two non-conjugated double bonds in the 1- and 4-positions of the ring, the double bonds being indicated by the dotted lines, and wherein $n$ is 1 or 2.

The invention also relates to a new alicyclic ketones which can be prepared by the process of the invention. Said ketones are: 2,6,6-trimethyl-1-(but-3-enoyl)-cyclohex-4-ene, 2,6,6-trimethyl-1-(but-3-enoyl)-cyclohex-3-ene and 2,6,6-trimethyl-1-(but-2-enoyl)-cyclohex-4-ene.

The invention further relates to new hydroxy derivatives of formula

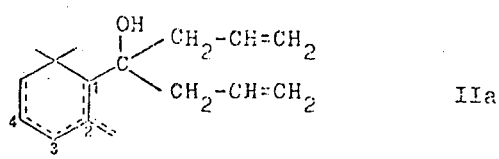

containing either a double bond in the 1-, (exo- or endocyclic), 2-, 3- or 4-position, or two conjugated double bonds in the 1- and 3- or (exocyclic) 2- and 3- positions, or two non-conjugated double bonds in the 1- and 4-positions of the ring.

The invention finally relates to the use of unsaturated alicyclic ketones of formula

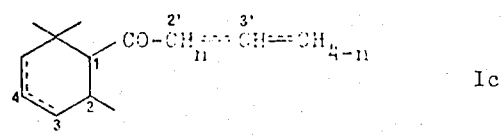

containing a double bond in the 2'- or 3'-position of the side chain and a double bond in the 3- or 4-position of the ring, as indicated by the dotted lines, and wherein $n$ is 1 or 2, as fragrances and flavour-modifying agents.

BACKGROUND OF THE INVENTION

One of the main objects of the aromatization of foodstuffs for instance is to restore the original quality and nature of the flavour, aroma and taste of a given foodstuff material. Very often in fact the organoleptic properties of foodstuffs particularly diminish or are somehow modified in the course of the processes of freezing and storage, or during the processing such as cooking or baking, to which the foodstuffs are subjected in order to yield an edible material.

In the past aromatization was mainly achieved by using materials of natural origin. Nowadays, however, synthetic chemical compounds are used at an ever increasing rate. Said compounds possess the advantage of being available very often in unlimited quantities and at prices lower than those of the natural materials. Moreover, due to the fact that the flavouring character of a natural material is the result of the overall effect determined by the combination and interaction of each of its constituents, the effects achieved by said natural material are very often not as well reproducible as those obtained by the use of the pure synthetic compounds.

In the field of perfumery the man in the art has to solve a similar problem in attempting to reconstitute the olfactive notes of certain natural essential oils or extracts. The perfumer's creativity however is continually boosted by the finding of new synthetic compounds, the organoleptic properties of which will enable him to introduce unprecedented olfactive characters or nuances into new phantasy perfume compositions.

As a consequence, the problem that the chemical industry has to solve is to satisfy the increasing demand of organoleptically interesting chemicals in order to better suit the specific needs of flavourists and perfumers.

The process of the present invention provides a novel and technically original solution to the problem set by the synthesis of unsaturated cycloaliphatic ketones of formula I. These compounds have been prepared in the past by various synthetic methods which can be resumed as follows:

a. partial hydrogenation of the corresponding acetylenic derivatives [Swiss patent No. 498,795];

b. direct condensation of an organo-metallic derivative of propene with a cyclogeranyl derivative [Swiss patent No. 503,648];

c. cyclization of a "pseudo-ketone" by means of acidic cyclization agents [Swiss patent No. 503,685];

d. dehydrogenation of a cyclohexenic ketone to afford the corresponding cyclohexadienic derivative [Swiss patent No. 505,773].

The above indicated methods have the disadvantage of i. affording the desired compounds only in poor yield and/or ii. using not easily accessible starting materials.

The process of the present invention does not have the said disadvantages and, as a consequence, it can be conveniently exploited by the chemical industry.

PREFERRED EMBODIMENTS OF THE INVENTION

The process of the present invention consists in pyrolizing an alcohol of formula II

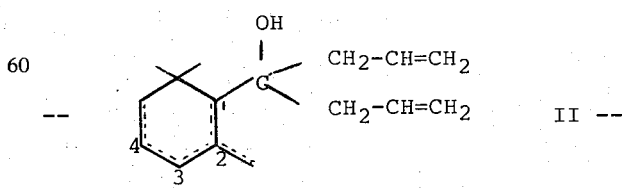

and subsequently condensing the volatile products formed during the pyrolysis.

Said pyrolysis can be carried out according to the usual techniques; for example, by directly heating the compound of formula II used as starting material. However, said compound is preferably pyrolyzed in the vapour phase, either in its pure form or in admixture with an inert gas such as nitrogen or argon.

The said pyrolysis can be carried out in an apparatus usually employed to this end and which is formed by a cylindrical element of quartz, comprising an external heating system. The volatile products formed during the pyrolysis can subsequently be condensed by means of several cooling devices, e.g. traps arranged in series and connected with the above said pyrolysis element.

The input of vapour which is to be subjected to the pyrolysis can vary within a wide range and in particular it depends upon the size of the chosen apparatus.

The heating time and temperature can also vary within wide ranges. Thus, the said pyrolysis can be carried out at a temperature comprised between about 300° and about 550° C, preferably between about 370° and about 450° C. Moreover, the reaction can proceed either at atmospheric pressure or at pressures lower than the former.

Pressures comprised between about 0.005 and about 30 Torr, preferably between about 0.05 and about 15 Torr are preferred. In said preferential range of temperatures and pressures, the pyrolysis is carried out on the compound of formula II in the vapour phase.

The compounds of formula I, obtained according to the process of the invention, include 2,6,6-trimethyl-1-(but-3-enoyl)-cyclohex-3-ene, 2,6,6-trimethyl-1-(but-3-enoyl)-cyclohex-4-ene and 2,6,6-trimethyl-1-(but-2-enoyl)-cyclohex-4-ene, which are new compounds.

According to the cited reaction conditions, there are obtained mixtures of alicyclic unsaturated ketones of formula

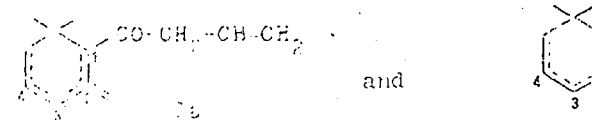

wherein the dotted lines have the same meaning as mentioned for formula I.

The relative proportions of the compounds of formula Ia and Ib cis- in the obtained mixtures depend upon the chosen temperature and heating time. Thus, when operating at temperatures which are near the upper limit of those above indicated, and for a prolonged heating period, mixtures essentially consisting of compound Ib cis- are obtained. Compound Ib cis- possess a side chain with a double bond having cis-configuration. The thus obtained mixtures can be easily separated, by means of preparative vapour phase chromatography or fractional distillation.

As mentioned above, the compounds Ia and Ib cis- possess interesting organoleptic properties and are, therefore, particularly appreciated in the perfumery or in the flavour industry. Moreover, they are also useful as intermediates in the preparation of compounds of formula

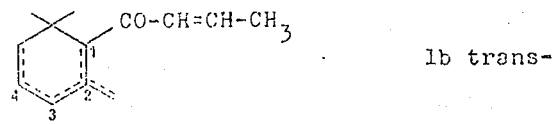

wherein the dotted lines have the same meaning as described for formula I. Some of said Ib trans- compounds are known as valuable perfuming and/or flavouring ingredients [cg. e.g. German Patent Application No. 2,022,216, laid open to public inspection].

The compounds of formula Ib trans- may be obtained by treating compounds of formula Ia or Ib cis- with an acidic or a base isomerization agent, according to the usual techniques [cf. e.g.: Synthesis 1970, 405]. For carrying out such an isomerization, mixtures of compounds Ia and Ib cis-, as directly obtained by the process of the invention, can be used without any previous separation of its individual components.

Most of the compounds of formula II used as starting materials in the above described process of the invention are new compounds. They include, however, a known compound of formula

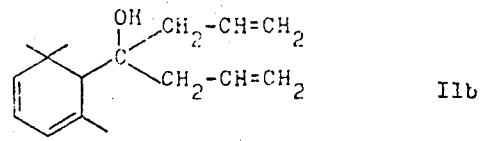

[cf.: Helv. Chim. Acta, 54, 1771 (1971)].

The new compounds of formula IIa include 2,6,6-trimethyl-1-(4-hydroxy-hepta-1,6-dien-4-yl)-cyclohex-1-ene, 2,6,6-trimethyl-1-(4-hydroxy-hepta-1,6-dien-4-yl)-cyclohex-2-ene, 2-methylene-6,6-dimethyl-1-(4-hydroxy-hepta-1,6-dien-4-yl)-cyclohexane, 2,6,6-trimethyl-1-(4-hydroxy-hepta-1,6-dien-4-yl)-cyclohex-3-ene, 2,6,6-trimethyl-1-(4-hydroxy-hepta-1,6-dien-4-yl)-cyclohex-4-ene, 2,6,6-trimethyl-1-(4-hydroxy-hepta-1,6-dien-4-yl)-cyclohexa-1,3-diene, 2,6,6-trimethyl-1-(4-hydroxy-hepta-1,6-dien-4-yl)-cyclohexa-1,4-diene and 2-methylene-6,6-dimethyl-1-(4-hydroxy-hepta-1,6-dien-4-yl)-cyclohex-3-ene.

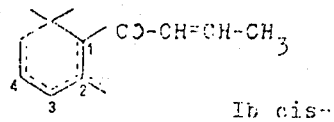

The new hydroxy compounds of formula IIa, as well as the known compound of formula IIb, can be obtained according to a synthetic method which comprises treating a compound of formula

wherein the dotted lines have the same meaning as indicated for formula I and wherein X represents a halogen atom or an O-CO-alkyl, O-CO-aryl, O-aryl-, O-alkyl or an OH group, with an organometallic compound of formula

CH$_2$=CH—CH$_2$ME                    IV wherein the symbol ME represents a metallic function such as Li, Zn, Cd or Mg-halogen. As a compound of formula III, an ester derivative of a lower aliphatic alcohol, e.g. compound IIIa, is preferred. Suitable organometallic derivatives include a compound which is obtained by treating magnesium metal with allyl-bromide or chloride. The reaction can be carried out under the usual conditions of a Grignard reaction [cf. e.g.: Helv. Chim. Acta, 59, 1767 (1971)].

Compounds IIIa-1, IIIa-2 and IIIa-3 can be obtained according to a process which is illustrated by the following reaction scheme:

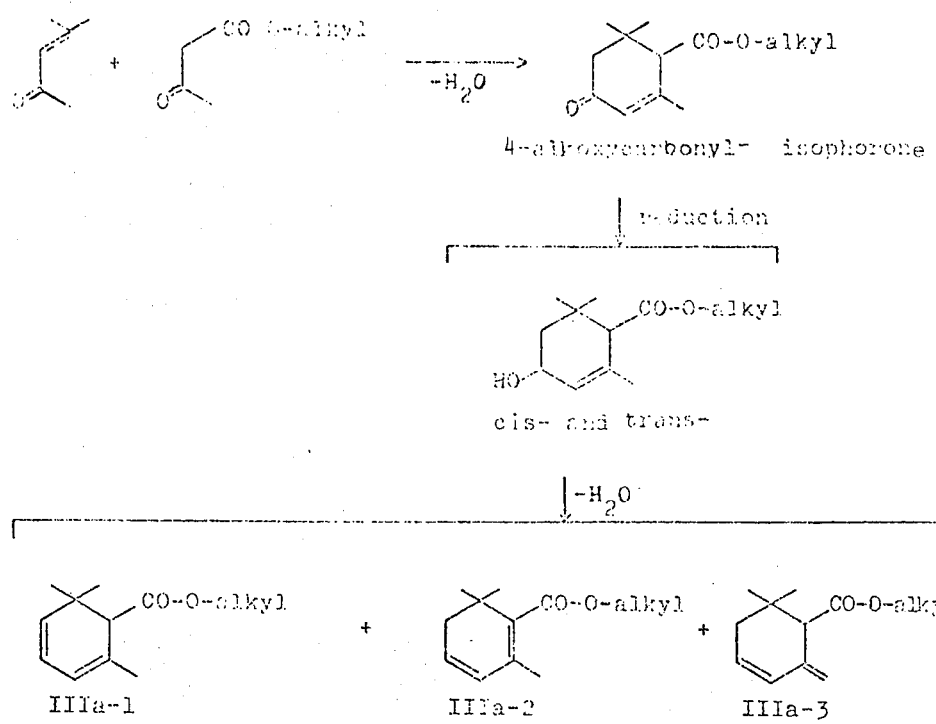

The first step of the process illustrated above consists in a condensation between mesityl oxide and an alkyl acetoacetate according to a known technique [see H. Rubinstein, J. Org. Chem., 27, 3886 (1962); J. D. Surmatis et al., J. Org. Chem., 35, 1053 (1970)].

The reduction of the 4-alkoxycarbonyl-isophorones can be carried out by means of reagents which are known to selectively reduce the carbonyl function to a secondary alcohol function, e.g. mixed hydrides of boron and an alkali metal, e.g. sodium or lithium [see e.g. H. O. House, "Modern Synthetic Reactions", Benjamin, Inc., New York (1965)].

The carbinols prepared according to the process described above can be obtained in a pure state by a separation by means of vapour phase chromatography or fractional distillation. However, for economic reasons, it is preferred to proceed to the subsequent dehydration on the mixture of isomers, such as it is obtained directly by the described reduction, in the presence of an acidic catalyst.

As an acidic dehydration catalyst a strong acid, e.g. phosphoric or sulphuric acid, is the preferred one.

The mixture comprising the cyclic esters IIIa, when previously subjected to fractional distillation or separation by means of vapour phase chromatography, yields the esters in a pure state.

The esters of formula IIIa containing two double bonds in the 1- and 4-positions of the ring can be obtained by treating the corresponding cyclohexa-2,4-diene derivative by means of a basic isomerization agent. Suitable basic isomerization agents include alkali metal alkoxides. [cf. e.g.: Synthesis, cited above].

The esters of formula IIIa containing one double bond in the 3- or the 4-position of the ring can be obtained according to the same method as that described in Chem. Ber., 102, 709 (1969). They can be equally synthesized by a synthetic method which may be illustrated by the following reaction scheme:

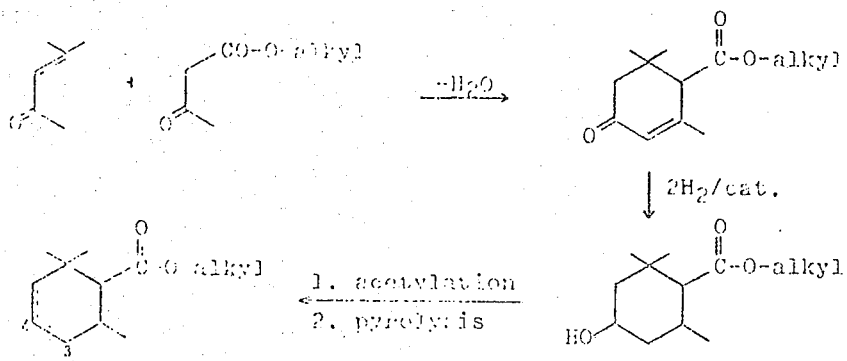

The first step in the above illustrated method consists in condensing mesityl oxide with an alkyl acetoacetate [cf. e.g. H. Rubinstein, J. Org. Chem., 27, 3886 (1962); J. D. Surmatis et al., J. Org. Chem., 35, 1053 (1970)].

The reduction of the 4-alkoxy-isophorone derivatives can be carried out by catalytic hydrogenation in the presence of a catalyst such as Raney nickel, platinum or palladium. The hydroxy compound thus obtained can be acetylated according to the usual methods [cf. e.g.: L. F. Fieser and M. Fieser, Organic Chemistry, Reinhold Publ. Corp., New York (1956), p. 187]. The final step, which consists in a pyrolysis, can be carried out as previously described for the compounds of formula II.

A further object of the present invention consists in using compounds of formula Ic as perfuming and/or flavouring ingredients. We have found in fact that said compounds possess interesting organoleptic properties and may advantageously be used in the perfumery and in the flavour industry.

The olfactive properties of the alicyclic unsaturated ketones of formula Ic differ from those of their known homologues insofar as they possess an original leathery, slighly harsh note which is reminiscent of that of laurel. They are thus particularaly useful as perfume ingredients for the manufacture of cosmetics. Their original olfactory note is particularly suitable for the compounding of perfumes which possess a masculine tonality, said perfume compositions being greatly appreciated in modern perfumery.

The amounts in which the compounds of formula Ic can be used in order to produce an interesting odoriferous effect can vary within a wide range. In the preparation of perfume compositions, for instance, interesting effects can be obtained with amounts of about 1 to about 5 %, or even 10 %, of the compounds of formula Ic, based on the total weight of the perfume composition. Depending on the desired particular effect, the above defined condensations may be lower or higher than the given limits, e.g. 0.1 to 20 %.

The compounds of formula Ic possess an original fruity and woody flavour, reminiscent of that of cooked fruit. In most instances they impart to the products in which they are incorporated a taste of red berries and can be used for improving the taste and flavour of artificial strawberry, cranberry, cherry, red-currants or analogous compositions. The said compounds can surprisingly be used for increasing the taste and flavour of products such as honey or red wine.

If the new compounds are used as flavouring agents or as additives destined to modify the organoleptic properties of foodstuffs for men and animals, beverages, pharmaceutical preparations and tobacco, their proportions can also vary within wide limits.

Interesting flavouring effects can e.g. be obtained by the use of 0.1 to 10 ppm of the new compounds, based on the total weight of the product to be flavoured. However, these ratios can be increased beyond 10 ppm and reach 100 ppm if it is desired to obtain special flavouring effects. In the preparation of flavouring compositions by admixture of the new compounds with other flavouring agents the said compounds can be used in ratios of about 0.1 to 15 % of the total weight of the composition. In many cases the average of the proportions used lie between 1 and 10 % of the total weight of the composition. It is to be understood that the limits of the proportions given above do not represent absolute limits; in certain cases where special effects are desired the new compounds can be used in higher or lower concentrations than those mentioned above.

The expression "foodstuff" is used in this specification in its broadest sense. It also comprises products such as coffee, tea and chocolate.

The invention is illustrated in a more detailed manner by the following examples wherein the temperatures are indicated in degrees centigrade.

EXAMPLE 1

2,6,6-Trimethyl-1-(but-3-enoyl)-cyclohex-3-ene 5.3 g of 2,6,6-trimethyl-1-(4-hydroxy-hepta-1,6-dien-4-yl)-cyclohex-1-ene (which can be prepared according to the method described hereinafter) were evaporated at a pressure of 12 Torr in an apparatus comprising an evaporation vessel connected with a quartz pyrolysis tube provided with external heating devices. The tube used had a length of 2 m and a diameter of about 2.5 cm. The vapours formed were heated to about 400° and the products formed during the pyrolysis were condensed in cooling traps connected together in a serie and externally cooled by means of dry ice.

There were thus obtained 4.1 g of an oil which, as shown by vapour phase chromatographic analysis, comprised 90 % of a mixture of 2,6,6-trimethyl-1-(but-3-enoyl)-cyclohex-1-ene and 2,6,6-trimethyl-1-(but-2-enoyl)-cyclohex-1-ene in a weight ratio of 6 : 4, respectively.

The thus obtained mixture can be subjected to a separation by means of preparative vapour phase chromatography or a distillation by means of a spinning band column to yield the said components in their pure state.

The analytical and spectral data are in agreement with those shown by a pure sample.

$n_d^{20} = 1.4897$; $d_4^{20} = 0.9361$

IR: 1675, 1640, 1618, 972 cm$^{-1}$

MS: m/e: 177, 69, 123, 192

The mixture obtained directly by the pyrolysis can further be treated in solution in tetrahydrofuran (15 ml) for 1 hour with 5 ml of an aqueous HCl solution at reflux temperature. By concentration of the reaction mixture under reduced pressure, addition of ether, washing with an aqueous NaHCO$_3$ solution until neutrality and evaporation of the volatile portions, there were obtained 3.8 g of pure 2,6,6-trimethyl-1(but-2-enoyl)-cyclohex-1-ene.

2,6,6-Trimethyl-1-(4-hydroxy-hepta-1,6-dien-4-yl) cyclohex-1-ene used as starting material in the above mentioned process can be obtained as follows:

a. 2,6,6-Trimethyl-1-methoxycarbonyl-cyclohex-2-ene

The compound was prepared by cyclization of methyl 3,7-dimethyl-octa-2,6-dienoate (methyl geraniate) according to known methods in the presence of traces of trifluoroboroetherate in benzene [see Helv. Chim. Acta., 42, 2598 (1959)]. B.p. 35°/0.1 Torr; $n_D = 1.4625$; $d^{20} = 0.9338$.

b. 2,6,6-Trimethyl-1-methoxycarbonyl-cyclohex-1-ene 2,6,6-trimethyl-1-methoxycarbonyl-cyclohex-2-ene, prepared as described in paragraph a), in toluene solution was refluxed for 2 hours in the presence of about 3-4 % of iodine.

By fractional distillation there was obtained the desired ester in its pure state. $n_D = 1.4682$; $d_4^{20} = 0.9766$.

c. 2,6,6-Trimethyl-1-(4-hydroxy-hepta-1,6-dien-4-yl)-cyclohex-1-ene

A few ml of allylchloride were treated under the so-called Grignard reaction conditions and under stirring with 2.8 g (3.3 equiv.) of magnesium turnings in suspension in 50 ml of anhydrous ether, in the presence of traces of iodine. To the thus obtained reaction mixture there was added dropwise a mixture of 6.5 g of 2,6,6- trimethyl-1-methoxycarbonyl-cyclohex-1-ene and 9 g of allyl chloride in 50 ml of anhydrous ether.

After the addition was completed, stirring was continued for 3 hours and the mixture was then poured into a cooled aqueous $NH_4Cl$ solution. After separation the ethereal phase was dried over anhydrous $Na_2SO_4$, then evaporated to dryness to yield a residue which, by fractional distillation, gave 5.5 g of an oily product of b.p. 70°–130°/0.2. Torr. The product was purified by vapour phase chromatography and yielded 2,6,6-trimethyl-1-(4-hydroxy-hepta-1,6-dien-4-yl)-cyclohex-1-ene in its pure form.

$n_D = 1.5014$; $d^{20} = 0.9389$

IR : 3525, 3075, 1640, 990, 910 $cm^{-1}$

NMR: 1.22 (6H,2s); 1.69 (3H,s); 4.8–6.1 (6H) δ ppm

MS: $M^+$=234 (0); m/e: 216 (0.1); 193 (17); 177 (3); 151 (100); 123 (50); 109 (25); 91 (8); 81 (40); 69 (60); 55(16); 41 (70); 29 (36).

The distillation also gave as by-products 15 % of the distillate of 2,6,6-trimethyl-1-(but-3-enoyl)-cyclohex-1-ene and 5 % of 2,6,6-trimethyl-1-(but-2-enoyl)-cyclohex-1-ene.

EXAMPLE 2

2,6,6-Trimethyl-1-(but-3-enoyl)-cyclohexa-1,3-diene 4 g of 2,6,6-trimethyl-1-(4-hydroxy-hepta-1,6-dien-4-yl)-cyclohexa-1,3-diene (which can be prepared according to the method described hereinafter) were evaporated and submitted to a pyrolysis under the same conditions as those described in Example 1 (400°/0.2 Torr).

There were obtained 3 g of a mixture containing 30 % of 2,6,6-trimethyl-1-(but-3-enoyl)-cyclohexa-1,3-diene, 20 % of 2,6,6-trimethyl-1-(but-2-enoyl)-cyclohexa-1,3-diene and 50 % of a tricyclic ketone having the formula

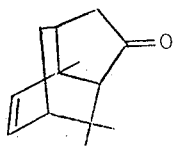

By separation by means of preparative vapour phase chromatography there were obtained 2,6,6-trimethyl-1-(but-3-enoyl)-cyclohexa-1,3-diene which, by treatment with HCl as indicated in Example 1, yielded 2,6,6-trimethyl-1-(but-2-enoyl)-cyclohexa-1,3-diene whose analytical data were identical with those shown by a pure sample [Helv. Chim. Acta, 53, 541 (1970)].

The carbinol used as starting material in the above process can be prepared as follows:

a. 2,6,6-Trimethyl-1-ethoxycarbonyl-cyclohexa-1,3-diene 1. 21 g of 3,3,5-trimethyl-4-ethoxycarbonyl-cyclohex-5-en-1-one were added dropwise to a suspension of 4 g of boron and sodium hydride in 100 ml of ethanol, maintained at about 5°–10° under vigorous stirring. The reaction mixture was kept overnight at room temperature, concentrated to one-third of its original volume and neutralized by means of diluted hydrochloric acid.

The organic phase which separated and extracted with ether, and the ethereal extracts were then concentrated to dryness to yield a residue (19 g) which, by preparative vapour phase chromatography, gave cis- and trans-3,3,5-trimethyl-4-ethoxycarbonyl-cyclohex-5-en-1-ol in a weight proportion of about 3:1 (yield 65 %).

The two isomers show the following analytical data:
A: $n_D^{20} = 1.4770$; $d_4^{20} = 1.020$ IR: 3400, 1725 $cm^{-1}$ NMR: 0.94 (6H,s); 1.22 (3H,t,J=7.5 cps); 1.62 (3H,s); 4.12 (2H); 4.1 (1H); 5.6 (1H) δ ppm MS: $M^+ = 212$ (7); m/e: 197 (48); 183 (18); 166 (12); 154 (41); 138 (52); 123 (100); 109 (41); 98 (68); 83 (52); 69 (36); 55 (32); 43 (59); 29 (81).

B: $n_D^{20} = 1.4788$; $d_4^{20} = 1.038$

IR: 3400, 1720 $cm^{-1}$

NRM: 0.9 (3H,s); 1.09 (3H,s); 1.22 (3H,t,J=8 cps); 1.65 (3H,s); 2,23 (1H,m); 4.1 (2H,q,J=7 cps); 5.55 (1H,m) δ ppm MS: $M^+ = 212$ (5); m/e: 197 (47); 183 (18); 166 (11); 151 (12); 138 (54); 123 (100); 109 (23); 98 (20); 83 (48); 69 (27); 55 (21); 43 (48); 29 (55).

2. 62 g of the mixture of isomers obtained according to the process described above were mixed with 0.5 g of p-toluenesulphonic acid in 200 ml of benzene and the resulting mixture was treated at boiling temperature in a water separator (2 hours). The reaction mixture was then treated with a diluted aqueous solution of sodium bicarbonate, washed with water until neutrality, dried and distilled. A mixture comprising 2,6,6-trimethyl-1-ethoxycarbonyl-cyclohexa-2,4-diene, 2,6,6-trimethyl-1-ethoxycarbonyl-cyclohexa-1,3-diene and 2-methylene-6,6-dimethyl-1-ethoxycarbonyl-cyclohex-3-ene in a weight proportion of about 28:42:30, respectively, was obtained; b.p. 60°/0.01 Torr; 34.2 g.

The mixture of products thus obtained was distilled by means of a spinning band fractionating column and the components thereof were separated by means of vapour phase chromatography (column: CARBOWAX).

2,6,6-Trimethyl-1-ethoxycarbonyl-cyclohexa-2,4-diene:

$n_D^{20} = 1.4718$; $d_4^{20} = 0.9550$; b.p. about 42°/0.2 Torr.

IR: 1730, 1660, 1600, 730 $cm^{-1}$

NMR: 1.05 (6H,s); 1.2 (3H,t,J=7.5 cps); 1.72 (3H,s); 2.71 (1H,m); 4.06 (2H,q,J=7 cps); 5.0–5.75 (3H) δ ppm MS: $M^+ = 194$ (20); m/e: 194 (20); 179 (1); 165 (0.5); 151 (1); 133 (1); 121 (100); 107 (30); 105 (40); 91 (22); 77 (12); 65 (5); 53 (4); 65 (5); 53 (4); 39 (8); 19 (28).

2,6,6-Trimethyl-1-ethoxycarbonyl-cyclohexa-1,3-diene:

$n_D^{20} = 1.4809$; $d_4^{20} = 0.9665$.

IR: 1720, 1635, 1585, 728 $cm^{-1}$

NMR: 1.08 (6H,s); 1.3 (3H,t,J=7 cps); 1.78 (3H,s); 4.15 (2H); 5.78 (2H,s) δ ppm

MS: $M^+ = 194$ (30); m/e: 179 (4); 165 (2); 149 (36); 135 (7); 121 (100); 106 (98); 91 (35); 77 (15); 65 (5); 53 (4); 41 (9); 29 (58).

2-Methylene-6,6-dimethyl-1-ethoxycarbonyl-cyclohex-3-ene:

$n_D^{20} = 1.4809$; $d_4^{20} = 0.9585$

IR: 3080, 1725, 1630 and 888 $cm^{-1}$

NMR: 0.89 (3H,s); 0.98 (3H,s); 1.2 (3H,t,J=7.5 cps); 2.88 (1H,s); 4.87 (2H,m); 5.6–6.2 (2H) δ ppm MS: $M^+ = 194$ (13); m/e: 179 (1); 165 (1); 149 (2); 129 (8); 121 (100); 105 (37); 91 (19); 77 (13); 65 (4); 55 (5); 41 (13 ); 29 (26).

3,3,5-Trimethyl-4-ethoxycarbonyl-cyclohex-5-en-1-one used as starting material in the preparation described above can be prepared as follows:

260 g of ethyl acetoacetate were mixed with 200 g of mesityl oxide and 200 g of trifluoroboro-etherate in a vessel cooled externally by water and ice in order to maintain the temperature of the mixture at about 0°–5°. The said mixture was maintained at this temperature for 3 days, poured then onto crushed ice (800 g) and neutralized with about 400 g of $Na_2CO_3$. Then it was extracted with ether and, after the usual treatments of separation, washing and drying, the combined organic extracts were concentrated. Distillation of the residue (135 g) gave 115 g of the desired product, b.p. 85°–90°/0.1 Torr, which had a purity of 80 % as shown by analysis by means of vapour phase chromatography. The product could subsequently be purified by redistillation.

b. 2,6,6-Trimethyl-1-(4-hydroxy-hepta-1,6-diene-4-yl)-cyclohexa-1,3-diene

The same procedure as that described in Example 1, paragraph (c), was followed, using 9.7 g of the ester prepared according to (a), 4 g of magnesium turnings and 13 g of allyl chloride in 100 ml of anhydrous ether. There were obtained 10.3 g of an oily material which, by fractional distillation (125°/0.1 Torr), yielded 8 g of a distillate comprising 80 % of the desired carbinol, 10 % of 2,6,6-trimethyl-1-(but-3-enoyl)-cyclohexa-1,3-diene and about 10 % of 2,6,6-trimethyl-1-(but-2-enoyl)-cyclohexa-1,3-diene. The thus obtained compounds were finally separated by means of preparative vapour phase chromatography.

EXAMPLE 3

2,6,6-Trimethyl-1-(but-3-enoyl)-cyclohex-2-ene 13 g of 2,6,6-trimethyl-1-(4-hydroxy-hepta-1,6-dien-4-yl)-cyclohex-2-ene, containing about 30 % of a mixture of 2,6,6-trimethyl-1(but-3-enoyl)- and 2,6,6-trimethyl-1-(but-2-enoyl)-cyclohex-2-ene (which can be prepared according to the method indicated hereinafter) were submitted to a pyrolysis as described in Example 1, at a temperature of about 380° and a pressure of 0.1 Torr. The pyrolysate obtained by condensation (about 11 g) was subjected to a fractional distillation to yield 9.8 g of a colourless oil comprising mainly 2,6,6-trimethyl-1-(but-3-enoyl)-cyclohex-2-ene (A) and 2,6,6-trimethyl-1-(but-2-enoyl)-cyclohex-2-ene (B).

(A): $n_D^{20} = 1.4830$; $d_4^{20} = 0.9371$
IR: 3080, 1820, 1710, 1640, 990, 900, 808 cm$^{-1}$
NMR: 0.88 and 0.93 (6H,2s); 1.58 (3H,s); 3.17 and 3.27 (2H,2m); 5.55 (1H,m); 4.85–6.3 (3H) δ ppm
MS: M$^+$ = 192 (5).

(B)
NMR: 0.85 and 0.96 (6H,2s); 1.62 (3H,s); 2.12 (3H,d,J=5.5 cps); 1.0–2.3 (4H, complex band; 2.95 (1H,s); 5.49 (1H,s); 6.25 (2H, complex band) δ ppm The carbinol used as starting material in the above process can be obtained as follows:

a. 2,6,6-Trimethyl-1-methoxycarbonyl-cyclohex-2-ene

This compound was prepared by a method analogous to that described in Helv. Chim. Acta, 42, 2598 (1959), by cyclization of methyl 3,7-dimethyl-octa-2,6-dienoate (methyl geraniate) in the presence of trifluoroboretherate in benzene. B.p. 35°/0.1 Torr; $n_D$ = 1.4625; $d^{20} = 0.9338$.

b. 2,6,6-Trimethyl-1-(4-hydroxy-hepta-1,6-dien-4-yl)-cyclohex-2-ene

The same procedure as that described in Example 1, paragraph (c), was followed, using 7 g of magnesium turnings, 24 ml of allyl chloride and 18.2 g of the ester prepared according to (a) in 350 ml of anhydrous ether.

23.2 g of crude material were obtained which, by fractional distillation, gave (60°–110°/0.1 Torr) 15.3 g of a distillate containing 40 % of the desired carbinol, 14.5 % of 2,6,6-trimethyl-1-(but-2-enoyl)-cyclohex-2-ene and 12 % of 2,6,6-trimethyl-1-(but-3-enoyl)-cyclohex-2-ene.

By separation by means of preparative vapour phase chromatography the said products were obtained in a pure form.

The carbinol showed the following analytical data:
B.p. 85°–90°/0.1 Torr; $n_D = 1.4988$; $d^{20} = 0.9363$.
IR: 3550, 3080, 1638, 990, 910, 825 cm$^{-1}$
NMR: 0.87 and 1.18 (2s,6H); 4.7 and 6.1 (7H) δ ppm
MS: M$^+$ = 234 (0); m/e: 193 (3); 175 (0.1); 151 (4); 135 (1); 124 (14); 109 (34); 95 (4); 81 (9); 69 (100); 55 (6); 41 (68); 27 (2).

EXAMPLE 4

2,6,6-Trimethyl-1-(but-3-enoyl)-cyclohex-3-ene and 2,6,6-trimethyl-1-(but-3-enoyl)-cyclohex-4-ene 41 g of a 45:55 mixture of 2,6,6-trimethyl-1-(4-hydroxyhepta-1,6-dien-4-yl)-cyclohex-3-ene (prepared according to the method described hereinafter) were submitted to a pyrolysis as indicated in Example 1, at a temperature of about 450° and a pressure of about 12 Torr.

The pyrolysate obtained by condensation (about 25 g) was subjected to a distillation to yield (b.p. 45°/0.07 Torr) 17 g of a mixture comprising 45:55 parts of the desired isomeric compound.

The separation thereof can be carried out by means of preparative vapour phase chromatography. However, for practical reasons this separation is superfluous as the obtained product can be used as such for the preparation of 2,6,6-trimethyl-1-(but-2-enoyl)-cyclohex-3-ene and 2,6,6-trimethyl-1-(but-2-enoyl)-cyclohex-4-ene, by means of a treatment with a HCl solution and subsequent separation.

The analytical data of the obtained mixture were the following:
IR: 3085, 1710, 1650, 990, 910, 710 cm$^{-1}$
NMR: 0.85–1.1 (9H); 3.08 (2H,d of d, J=7 cps); 4.8–6.2 (3H) δ ppm
MS: M$^+$ = 192 (3); m/e: 177 (4); 150 (37); 135 (4); 123 (100); 107 (11); 95 (13); 81 (50); 69 (22); 55 (12); 41 (28); 27 (4).

The mixture of isomeric carbinols used as starting material in the above described process can be prepared as follows:

21 g of 3,3,5-trimethyl-4-ethoxycarbonyl-cyclohex-5-en-1-one [see Example 2, letter (a)] were added to a mixture of $NaBH_4$ (4 g) in 100 ml of ethanol. The mixture was stirred overnight, concentrated to about one-third and finally neutralized with a diluted aqueous HCl solution.

The separated organic phase was then extracted with ether and the combined organic extracts were concentrated until a residue was obtained which, by distillation, yielded the desired carbinol in the form of 2 stereoisomers.

(A): $n_D^{20} = 1.460$; $d_4^{20} = 1.001$; b.p. 95°/0.1 Torr
IR: 3450 and 1725 cm$^{-1}$
NMR: 0.89 and 0.99 (2s, 6H); 0.91 (3H,d,J=6 cps); 1.24 (3H,t,J=7.5 cps); 3.34 (1H,m) δ ppm
MS : M$^+$ = 214; m/e: 196 (14); 181 (7); 169 (72);

150 (11); 140 (9); 129 (72); 123 (51); 107 (29); 101 (37); 83 (100); 69 (14); 55 (33); 41 (34); 32 (29).

(B): $n_D^{20} = 1.4692$; $d_4^{20} = 1.012$

IR: 3450, 1720 cm$^{-1}$

NMR: 3.75 (12H,m); 4.1 (2H,q,J=7 cps); 3.98 (1H,m) δ ppm

MS: M$^+$ = 214; m/e: 196 (20); 181 (8); 169 (12); 153 (5); 140 (7); 129 (74); 123 (51); 115 (15); 107 (32); 101 (41); 83 (100); 69 (18 ); 55 (41); 41 (3); 29 (42).

b. 2,6,6-Trimethyl-1-ethoxycarbonyl-cyclohex-3- and -4-ene 20 g of acetyl chloride and 11.5 g of acetic acid anhydride were added to a mixture of 46 g of the carbinol prepared according to paragraph a) in 91 g of N,N-dimethylaniline, the temperature of the mixture being maintained at about 20°. After having been stirred for 5 hours at room temperature and then overnight at 40°, the reaction mixture was poured onto crushed ice. The reaction mixture was extracted with ether and the combined extracts were neutralized by means of an aqueous H$_2$SO$_4$ solution, dried and concentrated to yield 53 g of crude material.

The said material was pyrolysed in a vapour phase at about 450° under reduced pressure (about 12 Torr) in a quartz pyrolysis apparatus of the same type as that described in Example 1.

There were thus obtained 33 g of pyrolysate comprising a mixture of stereoisomers of the desired esters in a weight ratio of about 1 : 1.

B.p. 100°/12 Torr; $n_D = 1.4573$; $d_4^{20} = 0.9452$.

IR: 1725, 1665, 710, 685 cm$^{-1}$

NMR: 0.95, 1.05 and 5.0–5.8 δ ppm

MS: M$^+$ = 196 (20); m/e: 181 (5); 167 (2); 150 (32); 135 (12); 123 (84); 170 (100); 91 (28); 82 (57); 67 (34); 55 (21); 41 (44); 29 (40).

c. 2,6,6-Trimethyl-1-(4-hydroxy-hepta-1,6-dien-4-yl)-cyclohex-3-ene and 2,6,6-trimethyl-1-(4-hydroxy-hepta-1,6-dien-4-yl)-cyclohex-4-ene The same procedure as that described in Example 1, paragraph (c), was followed, using 4 g of magnesium turnings 10 g of the mixture of esters prepared according to paragraph (b) and 12.9 g of allyl chloride in 120 ml of anhydrous ether.

There were obtained 10.7 g of crude product which, after distillation under reduced pressure (0.1 Torr), yielded 8.4 g of a mixture of the desired isomeric carbinols in a weight ratio of about 1 : 1.

The separation can be carried out by means of preparative vapour phase chromatography.

(A): $n_D = 1.5039$; $d^{20} = 0.9456$

IR: 3505, 3080, 1660, 1640, 990, 910, 720 cm$^{-1}$

NMR: 1.18 and 1.28 (6H, 2s); 4.8 and 6.2 (3H) δ ppm

MS: M$^+$ = 234 (0); m/e: 192 (6); 175 (0.1); 151 (6); 135 (1), 123 (20); 111 (12); 91 (4); 81 (9); 69 (100); 55 (7); 41 (52); 27 (3).

(B): $n_D = 1.5080$; $d^{20} = 0.9530$

IR: 3550, 3080, 1660, 1640, 990, 910 cm$^{-1}$

NMR: 1.15 (9H); 4.8–6.2 (3H) δ ppm

MS: M$^+$ = 234 (0); m/e: 192 (6); 175 (0.1); 151 (6); 123 (20); 111 (12); 91 (6); 81 (9); 69 (100); 41 (52), 27 (4).

By treating the above described mixture of 2,6,6-trimethyl-1-(but-3-enoyl)-cyclohex-3- and -4-ene with hydrochloric acid, as indicated in Example 1, there was obtained a 45:55 mixture of 2,6,6-trimethyl-1-(but-2-enoyl)-cyclohex-3-ene and 2,6,6-trimethyl-1-(but-2-enoyl)-cyclohex-4-ene (95 % yield). This mixture was finally separated by means of vapour phase chromatography.

A: IR: 1680, 1640, 1615, 965, 715 cm$^{-1}$

NMR: 0.88 (3H,d,J=6 cps); 0.89 and 1.07 (6H,2s); 1.87 (3H,d,J=6 cps); 2.7 (1H,m); 5.1–5.7 (2H,m); 5.8–7.0 (2H,m) δ ppm MS: M$^+$ = 192 (10); m/e: 177 (6); 123 (27); 107 (9); 91 (8); 81 (22); 69 (100); 55 (10); 41 (36).

B: IR: 1690, 1660, 1618, 965,, 705 cm$^{-1}$

NMR: 0.85 (3H,d,J=7 cps); 0.85 and 0.96 (6H,2s); 0.90 (3H,d,J=6 cps); 2.65 (1H,m); 5.2–5.6 (2H,m); 6.0–7.0 (2H,m) δ ppm MS: M$^+$ = 192 (13); m/e: 177 (8); 137 (6); 123 (28); 109 (13); 93 (8); 81 (22); 69 (100); 55 (10); 41 (35).

EXAMPLE 5

A base perfume composition for after-shave lotion was prepared by mixing the following ingredients (parts by weight):

| | |
|---|---|
| Synthetic bergamot | 200 |
| Lavender oil | 50 |
| Petitgrain bigarade | 90 |
| Sage oil | 50 |
| Methyl 2-pentyl-3-oxo-cyclo-pentylacetate 10 %* | 20 |
| Muscone 10 %* | 50 |
| Bourbon Vetiver oil | 20 |
| Verbena oil | 100 |
| Angelica roots oil | 20 |
| Galbanum oil | 10 |
| α-Isomethylionone | 50 |
| Coriander oil | 10 |
| Oak moss absolute 10 %* | 50 |
| Synthetic rose | 50 |
| Phenylethyl alcohol | 100 |
| Ylang | 30 |
| Cedryl acetate | 50 |
| Diethyl phthalate | 50 |
| Total | 1000 |

*in diethyl phthalate

When 5 g of 2,6,6-trimethyl-1-(but-2-enoyl)-cyclohex-3-ene were added to 95 g of the above base composition, there was obtained a perfume composition possessing an original and very masculine tonality, reminiscent of laurel.

When replacing in the above composition the mentioned alicyclic unsaturated ketone by the same amount of either 2,6,6-trimethyl-1-(but-3-enoyl)-cyclohex-3-ene or 2,6,6-trimethyl-1-(but-3-enoyl)-cyclohex-4-ene or 2,6,6-trimethyl-1-(but-2-enoyl)-cyclohex-4-ene, similar, however slightly less pronounced effects were observed.

EXAMPLE 6

A flavouring composition of the "Tutti-Frutti" type was prepared by mixing the following ingredients (parts by weight):

| | |
|---|---|
| Vanillin | 20 |
| Allyl caproate | 10 |
| Citral | 20 |
| Amyl butyrate | 35 |
| Orange oil | 45 |
| Ethyl butyrate | 75 |
| Ethyl acetate | 185 |
| Amyl acetate | 185 |
| Lemon oil | 400 |
| Total | 975 |

25 g of 2,6,6-trimethyl-1-(but-2-enoyl)-cyclohex-3-ene were added to 975 g of the above mixture and the resulting composition was called "test" composition. A "check" composition was prepared by the addition of 25 g of lemon oil to 975 g the above mixture The "test" and "check" compositions were added to the foodstuffs described below in the indicated proportions (100 kg of product to be flavoured):

```
Cake         20 g
Custard      5 – 10 g
Candy        15 – 20 g
```

Candy: 100 ml of sugar syrup (obtained by dissolving one kilogram of sucrose in 600 ml of water) and 20 g of glucose were mixed and slowly heated to 145°. The flavour was added to the mass and the mixture was allowed to cool and harden.

Custard: A mixture of 60 g of sucrose and 3 g of pectin were added, while stirring, to 500 ml of warm milk. The mixture was brought to boiling point for a few seconds and the flavour was added, whereupon the whole was cooled.

Cake: The following ingredients were mixed: 100 g of vegetable margarine, 1.5 g of NaCl, 100 g of sucrose, 2 eggs and 100 g of flour. The flavour was added to the above mass and the whole was heated to 180° for 40 minutes.

The samples of finished foodstuff were tasted by a group of experts who had to state their opinion as to the taste of the samples which had been submitted to them. All the members of the group declared without any hesitation that the "test" samples had a more marked fruity and woody note than that of the "check" samples and that they moreover possessed a character reminiscent of cooked fruit.

Analogous results were obtained by replacing in the above example 2,6,6-trimethyl-1-(but-2-enoyl)-cyclohex-3-ene by 2,6,6-trimethyl-1-(but-3-enoyl)-cyclohex-3-ene, 2,6,6-trimethyl-1-(but-3-enoyl)-cyclohex-4-ene or 2,6,6-trimethyl-1-(but-2-enoyl)-cyclohex-4-ene.

EXAMPLE 7

A base perfume composition of the Chypre type was prepared by mixing the following ingredients (parts by weight):

| | |
|---|---|
| Bergamot | 180 |
| Sweet orange oil | 5 |
| Synthetic Neroli | 10 |
| Synthetic Rose | 90 |
| Synthetic Jasmin | 90 |
| Ylang extra | 60 |
| Methylionone | 60 |
| Hydroxycitronellal | 60 |
| Santal oriental | 30 |
| Patchouli | 15 |
| Vetiveryl acetate | 45 |
| Natural degreased civet 10 %* | 30 |
| Labdanum ciste absolute 10 %* | 20 |
| Musk keton | 40 |
| 1,1-dimethyl-6-ter butyl-4-acetylindane | 5 |
| Coumarin | 30 |
| Trichloromethylphenyl-carbinyl acetate | 15 |
| Tarragon 10 %* | 30 |
| Oak moss absolute 50 %* | 60 |
| Benjoin resin 10 %* | 15 |
| Cinnamic Alcohol of Styrax | 15 |
| Jasmin absolute | 15 |
| Rose absolute | 10 |
| Cyclopentadecanolide 10 %* | 20 |
| Methylnonylacetic aldehyde | 15 |
| Ethanol | 35 |
| Total | 1000 |

*in 95 % ethanol

By adding to 99 g of this mixture 1 g of 2,6,6-trimethyl-1-(buten-2-oyl)-cyclohex-3-ene, there was obtained a composition which was more powerful than the basic composition. Moreover its diffusion was improved and it had a very natural richness.

When replacing 2,6,6-trimethyl-1-(buten-2-oyl)-cyclohex-3-ene by 2,6,6-trimethyl-1-(buten-2-oyl)-cyclohex-4-ene or 2,6,6-trimethyl-1-(buten-3-oyl)-cyclohex-3- or -4-ene analogous results were obtained.

EXAMPLE 8

A base perfume composition of the floral type was prepared by mixing the following ingredients (parts by weight):

| | |
|---|---|
| Decanal 10 %* | 10 |
| Undecylenic aldehyde 10 %* | 20 |
| Lauric aldehyde 10 %* | 10 |
| Methyl-nonyl-acetic aldehyde 10 %* | 5 |
| Synthetic lily of the valley | 165 |
| Synthetic Lilac | 30 |
| Synthetic Rose | 70 |
| Synthetic Jasmin | 120 |
| Bergamot | 60 |
| Tarragon 10 %* | 30 |
| Ylang extra | 90 |
| Synthetic Carnation | 60 |
| Methylionone | 60 |
| Vetiveryl acetate | 40 |
| Santalol | 20 |
| Decolourized oak moss absolute 10 %* | 30 |
| Natural degreased civet 10 %* | 30 |
| Lily absolute 1 %* | 20 |
| Orange blossom absolute 10 %* | 20 |
| Jasmin absolute | 20 |
| Rose absolute | 10 |
| Musk ketone | 40 |
| Trichloromethyl-phenyl-carbinyl acetate | 20 |
| Colourless Tolu Balm absolute 10 %* | 150 |

*in 95 % ethanol

When adding to 99 g of this mixture 1 g of 2,6,6-trimethyl-1-(buten-2-oyl)-cyclohex-3-ene, there was obtained a more powerful composition than the basic composition. Moreover its diffusion was improved and it had a very natural richness.

When replacing 2,6,6-trimethyl-1-(buten-2-oyl)-cyclohex-3-ene 2,6,6-trimethyl-1-(buten-2-oyl)-cyclohex-4-ene or 2,6,6-trimethyl-1-(buten-3-oyl)-cyclohex-3- or -4-ene analogous results were obtained.

I claim:

1. Compounds having the formula

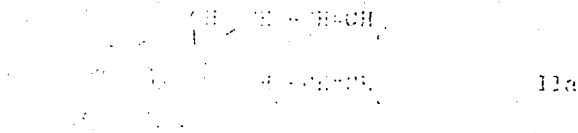

containing either a double bond in the 1-, (exo- or endocyclic) 2-, 3- or 4-position, or two conjugated double bonds in the 1- and 3- or (exocyclic) 2- and 3-positions, or two non-conjugated double bonds in the 1- and 4-positions of the ring.

2. 2,6,6-Trimethyl-1-(4-hydroxy-hepta-1,6-dien-4-yl)-cyclohex-1-ene.

3. 2,6,6-Trimethyl-1-(4-hydroxy-hepta-1,6-dien-4-yl)-cyclohex-2-ene.

4. 2,6,6-Trimethyl-1-(4-hydroxy-hepta-1,6-dien-4-yl)-cyclohex-3-ene.

5. 2,6,6-Trimethyl-1-(4-hydroxy-hepta-1,6-dien-4-yl)-cyclohex-4-ene.

6. 2,6,6-Trimethyl-1-(4-hydroxy-hepta-1,6-dien-4-yl)-cyclohexa-1,3-diene.

* * * * *

UNITED STATES PATENT AND TRADEMARK OFFICE
CERTIFICATE OF CORRECTION

PATENT NO. : 3,887,625
DATED : June 3, 1975
INVENTOR(S) : KARL-HEINRICH SCHULTE-ELTE It is certified that error appears in the above-identified patent and that said Letters Patent are hereby corrected as shown below:

Column 1, lines 7-12 formula illegible.

Column 1, line 23 "cyclohex-4-ene" should read -- cyclohex-3-ene.--

Column 1, line 24 "cyclohex-3-ene" should read -- cyclohex-4-ene.--

Column 1, lines 43-52 formula illegible.

Column 2, line 37 "No. 503,648" should read -- No. 503,684 --.

Column 3, lines 38-43 formula illegible.

Column 4, line 4 "[cg. e.g." should read -- [cf. e.g. --.

Columns 5 and 6, lines 4-32 formula illegible.

Columns 5 and 6, lines 47-63 formula illegible.

Column 7, line 20 "particularaly" should read -- particularly --.

Column 7, line 34 "condensations" should read -- concentrations --

Column 10, line 20 "2.62g" should read -- 2) 62g --.

Column 16, line 42 "cyclohex-3-ene  2,6,6-" should read
-- cyclohex-3-ene by 2,6,6- --.

In Claim 1:

Column 16, lines 47-54 formula illegible.

Signed and Sealed this fourth Day of November 1975

[SEAL]

Attest:

RUTH C. MASON
Attesting Officer

C. MARSHALL DANN
Commissioner of Patents and Trademarks